United States Patent [19]

Spiesman

[11] 4,172,280
[45] Oct. 23, 1979

[54] DIGITAL OUTPUT CONTROL CIRCUIT

[75] Inventor: Robert L. Spiesman, Phoenix, Ariz.

[73] Assignee: Honeywell Inc., Minneapolis, Minn.

[21] Appl. No.: 865,382

[22] Filed: Dec. 29, 1977

[51] Int. Cl.² .............................................. G06F 15/46
[52] U.S. Cl. .................................... 364/107; 364/119;
364/900
[58] Field of Search ............... 364/100, 103, 104, 107,
364/114, 117, 200 MS File, 900 MS File, 119

[56] References Cited

U.S. PATENT DOCUMENTS

| 3,744,028 | 7/1973 | Krik | 364/200 |
| 3,829,842 | 8/1974 | Langdon et al. | 364/103 X |
| 3,969,703 | 7/1976 | Kwiatkowski et al. | 364/103 X |

Primary Examiner—Joseph F. Ruggiero
Attorney, Agent, or Firm—Laurence J. Marhoefer; Lockwood D. Burton

[57] ABSTRACT

There is shown a digital output circuit wherein digital data from a computer based controller is applied as input signals to a set of holding latches which are, in turn, enabled by control circuitry such as by response to address signals. The digital data stored in the several holding latches are applied as input signals to a corresponding number of relay driver circuits. The relay driver circuits are, in one aspect of the invention, coupled to selectively operate output control relays in accordance with the data signals applied to the driver circuits therefor. In another form, the driver circuits are connected directly to an output circuit without the intervention of relays. Selective control is provided for establishing the relay output signal in a latched or holding mode or in a controlled time momentary closure mode. In the momentary closure mode the time is established by a data controlled counter. Additionally, a protective circuit is provided which prevents the output circuit from issuing a spurious output signal during a power-up or power-down interval.

7 Claims, 5 Drawing Figures

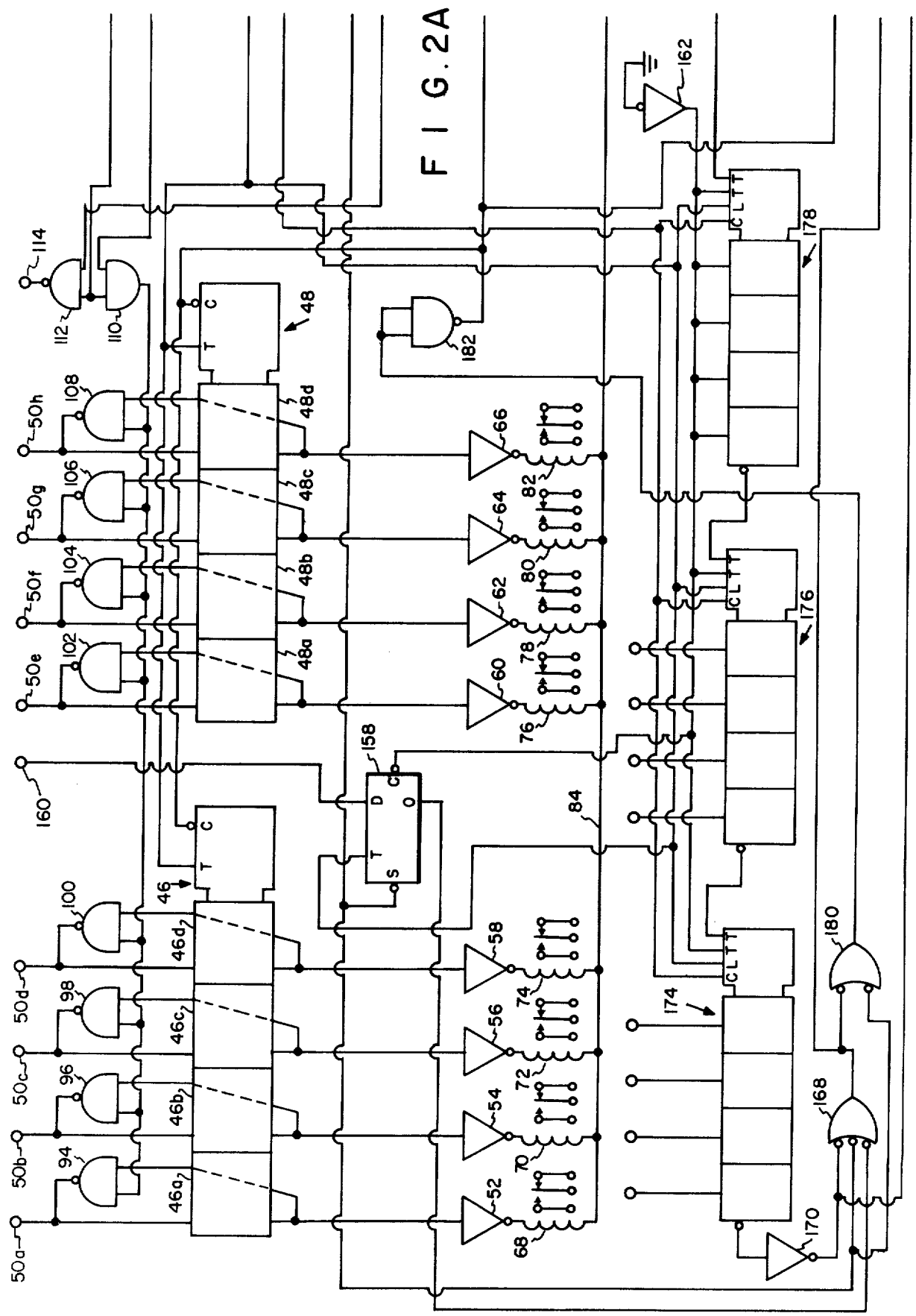

DIGITAL OUTPUT CONTROL CIRCUIT

BACKGROUND OF THE INVENTION

The present invention relates to process control apparatus. More particularly, it relates to improved digital output circuitry for use with a computer based process control system.

In the art of industrial process control, there have been provided systems wherein various parameters of a process are measured, compared with a desired value, and a difference therebetween used to derive a control or output signal. In a number of cases both the input, or measured variable, signals and the output signals are in the form of analog signals. In some cases, however, it is desirable to have the output signals in a digital form. The digital output signals may, in turn, be in four different formats. The signals may be in the form of latched holding relay closures; they may be in the form of momentary relay closures; or they may be in the form of solid state output signals either holding or momentary.

SUMMARY OF THE INVENTION

It is, accordingly, an object of the present invention to provide an improved digital output circuit for computer based process control systems.

It is another object of the present invention to provide an improved digital output circuit as set forth having accommodations for four different modes of output signals.

In accomplishing these and other objects, there has been provided, in accordance with the present invention, a digital output circuit wherein digital data from the controller is applied as input signals to a set of holding latches which are, in turn, enabled by control circuitry such as by response to address signals. The digital data stored in the several holding latches are applied as input signals to a corresponding number of relay driver circuits. The relay driver circuits are, in one aspect of the invention, coupled to selectively operate control relays in accordance with the data signals applied to the driver circuits therefor. In another form, the driver circuits are connected directly to an output circuit without the intervention of relays. Selective control is provided for establishing the relay output signal in a latched or holding mode or in a controlled time momentary closure mode. In the momentary closure mode the time is established by a data controlled counter. Additionally, a protective circuit is provided which prevents the output circuit from issuing a spurious output signal during a power-up or power-down interval.

BRIEF DESCRIPTION OF THE DRAWINGS

A better understanding of the present invention may be had from the following detailed description when read in the light of the accompanying drawings in which.

DETAILED DESCRIPTION

Figure 1:
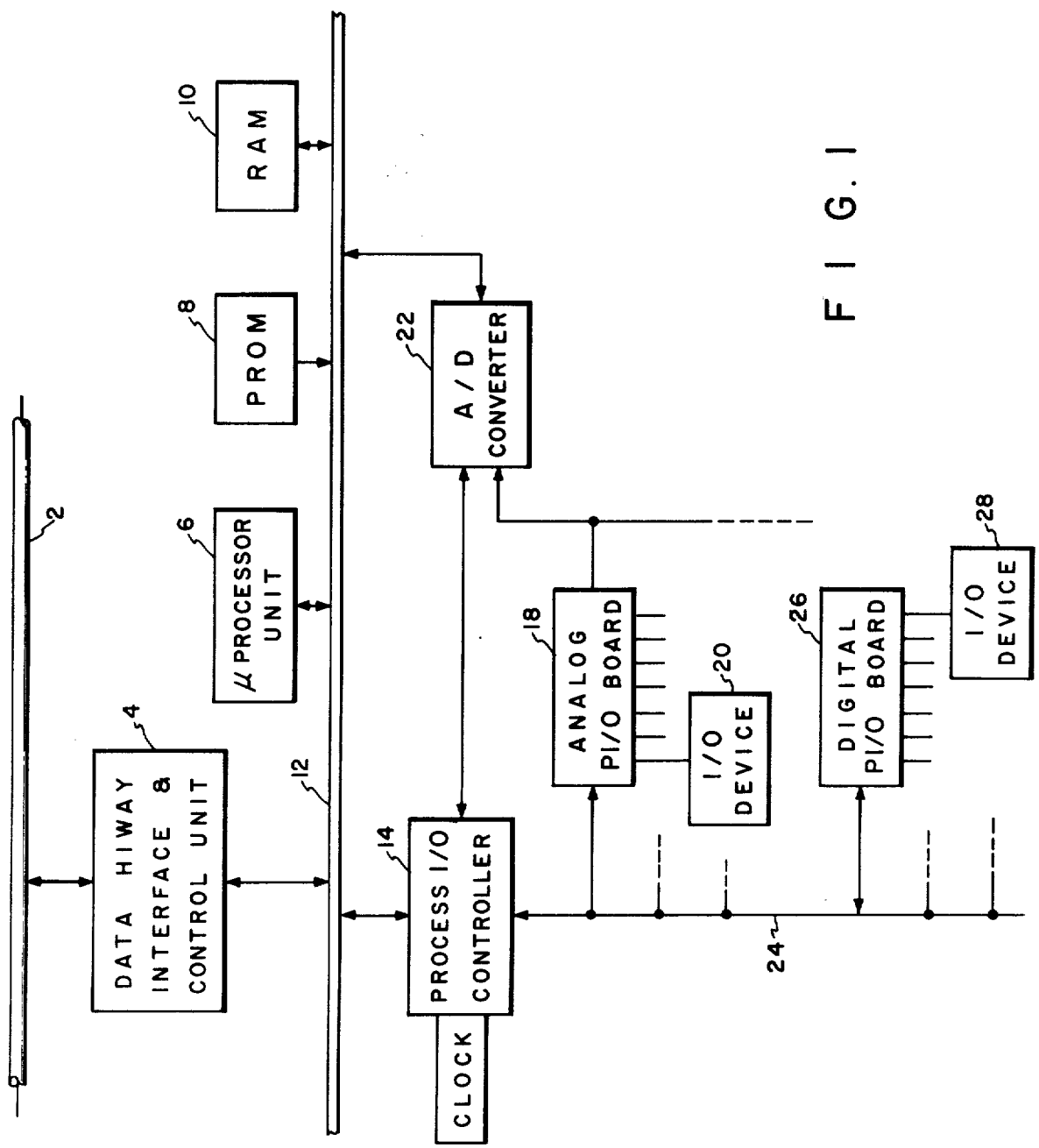
FIG. 1 is a block diagram of a computer based process control system embodying the present invention.

Referring now to the drawings in more detail, there is shown in FIG. 1 in block diagram form a computer based control system such as is shown in copending application of Woods et al Ser. No. 773,913, filed Mar. 3, 1977. In FIG. 1 there is shown a data highway 2, or communication bus, for communication with a host computer. A data highway interface and control unit 4 interfaces that communication bus with a subordinate control system. The subordinate control system includes a microprocessor unit 6, a PROM 8 in which is stored, among other things, the operational program for the microprocessor unit 6. There is also provided a RAM 10 in which is stored, among other things, database tables for each of the data points involved in the control system. These are all interconnected with each other and with the data highway interface and control unit 4 by a microprocessor bus 12. Operatively connected to the bus 12 for responsive communication with the microprocessor unit 6 is a process input/output controller 14. The process input/output controller 14 includes a clock 16 which generates a series of clock pulses for the coordinate operation of the apparatus connected to be responsive to the process input/output controller 14. Included among the apparatus connected to the process input/output controller is one or more analog process input/output boards 18 each having up to eight analog input or output devices 20. An A to D converter 22 is connected to the analog process I/O boards 18 to convert the analog signals into digital signals for use by the microprocessor unit 6. Further, there is connected to the process I/O controller 14 through the process I/O bus 24 a digital process I/O board 26 to which are connected a plurality of digital input or output devices 28.

Under the control of the microprocessor unit 6, process data is gathered from the analog or digital input devices and applied through the process I/O controller 14 to the microprocessor unit 6 for manipulation in accordance with the control algorithm for the particular data point. Also under the control of the microprocessor unit, output control signals are applied through the process I/O controller 14 and the analog and/or digital output boards 18 and 26 to the respective control devices or output devices 20 and 28. In the present case, it is the digital output board 26 which is of particular interest.

Figure 2B:
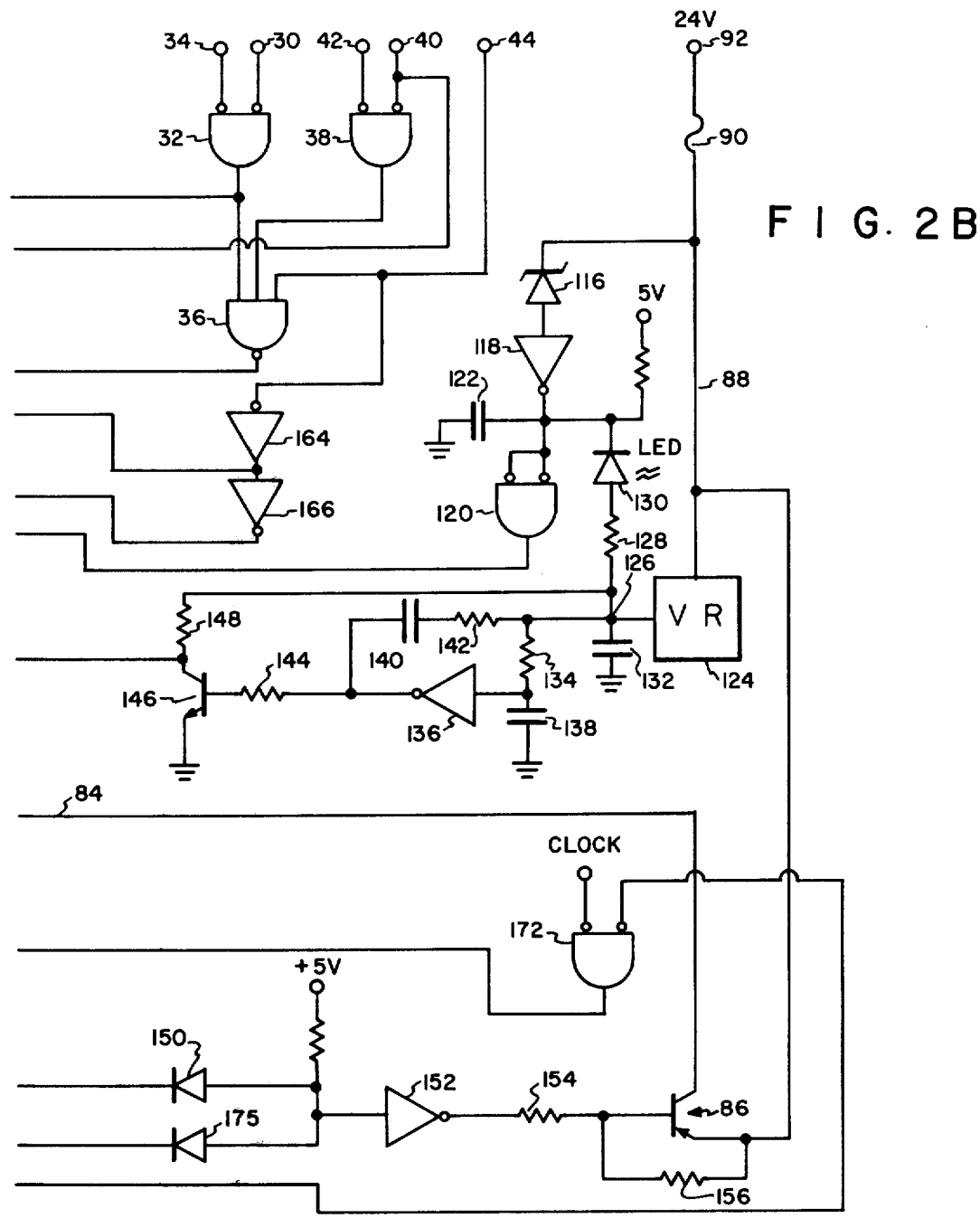
FIG. 2 is a logic diagram of a digital output circuit embodying the present invention.
Figure 2:

To this end, there is shown in FIG. 2 a detailed logic diagram of a digital output circuit such as may be included in the digital output board 26. In the microprocessor bus 12 there are included eight leads for digital output data in addition to address lines and instruction lines. The digital output board 26 includes output circuits for eight digital output devices 28. In the system, there may be a significant number of digital output boards 26 each accommodating eight output devices. Thus, each of the eight lines carrying digital output data from the microprocessor unit potentially represents one of the eight output devices in each of the digital output boards. The address data also carried by the microprocessor bus 12 effects a selection of which one of the digital boards will respond to the data on the eight digital output lines.

Configured in accordance with an exemplary model constructed in accordance with the present invention, the output boards are arranged in four card files of eight boards each. Thus each card file will have eight slots with one board in each slot. The digital code from the microprocessor unit for selecting the slot and card file is transmitted along the microprocessor bus 12 to the process I/O controller 14. In the controller 14 the address code is decoded and a first and second enable signal is transmitted from the controller 14 to the selected digital board. The card file assembly selection signal from the process I/O controller 14 is applied as one input signal on the terminal 30 of a NAND gate 32. The slot or board selection signal is applied to a second input terminal 34 of the gate 32. The output of the gate 32 is applied as one input signal to a three input NAND gate 36. A NAND gate 38 has one input terminal 40 connected to receive a board "direction" signal, that is, a direction whether to read or write; the other input terminal 42 is connected to receive a "write-strobe" signal. Both the "direction" signal and the "strobe" signal are also transmitted from the microprocessor unit through the process I/O controller 14. The output of the NAND gate 38 is connected to a second input terminal of the gate 36. The third input terminal of the gate 36 is connected to an input terminal 44 to which is applied a "master-clear" signal from the mircoprocessor unit 6.

There is provided a first latch assembly 46 and a second latch assembly 48. These latch assembly structures are shown in block diagram form and may be of the commercially available type identified as SN74LS175, manufactured by, among others, Texas Instruments Inc. Each latch assembly essentially comprises four flip-flop units with common controls. The output of the gate 36 is connected to the "toggle" or "clock" input of both of the latch assemblies 46 and 48. The data input signals from the microprocessor 6, through the process I/O controller 14 are applied to the latch input terminals 50a through 50h. These are, in turn, applied as input signals, respectively, to the individual latches of the two latch assemblies 46 and 48. Thus the input terminal 50a is connected to the input of latch 46a, input terminal 50b is connected to the input of latch 46b, 50c is connected to the input of latch 46c, 50d is connected to the input of latch 46d. The input terminal 50e is connected to the input of latch 48a, 50f is connected to the input of latch 48b, terminal 50g is connected to the input of latch 48c, and terminal 50h is connected to the input of latch 48d. The output of the latch 46a is connected to the input of a relay driver or amplifier 52. The output of the latch 46b is connected to the input of a relay driver or amplifier 54. The output of the latch 46c is connected to the input of a relay driver or amplifier 56. The output of the latch 46d is connected to the input of a relay driver or amplifier 58. Similarly the outputs, respectively, of the latches 48a through 58d are connected to the inputs of relay drivers or amplifiers 60, 62, 64, and 66. The output of each of the amplifier/drivers 52 through 66 are connected, respectively, to relay operating coils 68, 70, 72, 74, 76, 78, 80, and 82. The opposite ends of those relay coils are connected to a common bus 84. The bus 84 is connected to the collector of a power transistor 86, the emitter of which is connected to a power supply line 88. The power supply line 88 is connected through a fuse 90 to a terminal 92 which, in turn, is adapted to be connected a power supply lead carrying for example 24 volts dc.

The output of the latches 46a through 46d and 48a through 48d are also connected, respectively, to one of the input terminals of a corresponding number of NAND gates 94, 96, 98, 100, 102, 104, 106 and 108. The other input terminal of each of those NAND gates 94 through 108 is connected to the output terminal of an AND gate 110. One input terminal of the AND gate 110 is connected to the input terminal 40, which carries the read/write "direction" signal. The other input terminal of the gate 110 is connected to the output of the NAND gate 32 which carries the "board address" signal. The output of the gates 94 through 108 are connected, respectively, to the terminals 50a through 50h, the data leads of the bus connecting the board to the microprocessor unit 6.

A NAND gate 112 has one input terminal also connected to the output of the gate 32. The other input terminal of the gate 112 is connected to the output of a power supply detection circuit. The output of the gate 112 is connected to a terminal 114 to which is connected one of the leads of the bus connecting the board to the microprocessor unit. When the gate 112 is made," a signal is transmitted back to the microprocessor unit indicating that the addressed board is present and is powered. The power supply detection circuit includes a Zener diode 116 having its cathode connected to the power supply lead 88 its anode is connected to an inverting amplifier 118. The output of which is connected to an inverter 120. The output of the inverter 120 is connected to the second input terminal of the gate 112. The output terminal of the inverting amplifier 118 is connected through a capacitor 122 to ground.

A voltage regulator module 124 has an input terminal connected to the power supply lead 88. The voltage regulator 124 may be of a commercially available type identified as an LM340 manufactured by, among others, National Semiconductor Company. The output of the voltage regulator 124 is connected to a junction 126. Between the junction 126 and the output of the inverting amplifier 118 there is connected a series resistor 128 and a light emitting diode 130. A filter capacitor 132 is also connected between the junction 126 and ground. The junction 126 is also connected to a power responsive protection circuit including an input resistor 134 having one end connected to the junction 126 the other end connected to the input of an inverting amplifier 136 and through a filter capacitor 138 to ground. The output of the amplifier 136 is connected through a feedback capacitor 140 and a resistor 142 to the junction 126. The output of the inverting amplifier 136 is also connected through a coupling resistor 144 to the base electrode of a transistor 146. The emitter of the transistor 146 is connected to ground. The collector of the transistor 146 is connected through a load resistor 148 to the junction 126. The output of the transistor 146 is taken at the collector thereof and is connected to the "clear" input terminal of the latch assemblies 46 and 48. The output of the transistor 146 is also connected through a diode 150 to the input of an inverter 152. The output of the inverter 152 is connected through a coupling resistor 154 to the base electrode of the transistor 86. A feedback resistor 156 establishes the gain of the transistor 86.

It was earlier mentioned that the relays could be operated in a latched or holding mode or in a momentary on mode. To this end there is provided a mode flip-flop 158 having a data input connected to a "function" terminal 160. The "toggle" or "clock" terminal of the flip-flop 158 is connected to the outputs of the gate 36. The "clear" input of the flip-flop 158 is biased to an enabled condition, being connected to the output of an inverter 162 which has its input connected to ground. The "preset" input terminal of the flip-flop 158 is connected to be enabled in the absence of a "master-clear" signal. The "master-clear" signal is applied at the input terminal 44 through a first inverter 164 and a second inverter 166, the output of the inverter 166 being connected to the "set" input terminal of the flip-flop 158. The "reset" output terminal of the flip-flop 158 is connected to one input terminal of a three input NAND gate 168. A second input terminal of the NAND gate 168 is connected to the output of the inverter 166, in the "master-clear" circuit. The third input terminal of the gate 168 is connected to the output of an inverter 170. The output of the inverter 170 is also connected to one input terminal of a NAND gate 172. The other input terminal of the gate 172 is connected to a source of clock pulses such as may be supplied over the bus from the process I/O controller 14. The output of the gate 168 is connected through a diode 175 to the input of the inverter 152. The output of the gate 168 is also connected to one input terminal of a NAND gate 180. The output terminal of the gate 180 is connected to the input of an inverter 182. The output of the inverter 182 is also connected to the "clear" input terminals of the latches 46 and 48. The second input terminal of the gate 180 is connected to the output of the inverter 166 in the "master-clear" circuit.

In order to establish the length of time that the selected relays will be held in their "on" condition when the system is in the "momentary closure" mode, there is provided a counter which may be preset by coded digital data supplied from the microprocessor unit in accordance with a predetermined characteristic established in the data-base table stored in the RAM 10 for the particular output board. In the exemplary embodiment, the counter is formed of three cascaded four bit counter modules 174, 176, 178 which may be of a commercially available type identified as SN74LS193, manufactured by, among others, Texas Instruments Inc. Each of the counter modules includes four flip-flops having common input control. Additionally each of the counter modules is provided with a "borrow out" terminal. The sequentially first of these counter modules 178 has all of its four data input terminals biased to a logical "high" state by being connected to the output of the inverter 162. The data input lines of the second and third counter module are connected to the microprocessor unit through the bus 12.

The configuration word stored in the RAM 10 for each of the digital output boards includes a "function" signal which is applied to the input terminal 160 to determine the "set" of the flip-flop 158, and also includes a digital code for application to the eight input terminals of the counters 176 and 178 thereby to preset a predetermined count in the counters 178, 176 and 174. The counters are arranged to operate in a "count-down" mode by having their "count-up" "clock," or "toggle," inputs biased to a logical "high" state by also being connected to the output of the inverter 162. The "clear" terminal of each of the counter modules is connected to the output of the inverter 164. The "load" terminal of each of the counter modules 174, 176 and 178 is connected to the output of the gate 36. The "count-down" toggle input of the first module 178 is connected to the output of the gate 172. The "count-down" toggle input of the second module 176 is connected to the "borrow-out" terminal of the first module 178. Similarly, the "count-down" toggle input of the third module is connected to the "borrow out" terminal of the second module. The "borrow out" terminal of the third module is connected to the input of the inverter 170.

In operation, data signals from the microprocessor units are transmitted by way of the bus 12 through the process I/O controller 14 to the digital output board 26. These digital signals appear on the input terminals 50a through 50h indicative of which, if any, of the relays 68 through 82 are to be energized. Of course, the corresponding input terminals of all of the several digital output boards are connected, respectively, to the same leads in the communication bus. Thus, the data input terminals of all of the boards are connected in parallel. When the particular board has been addressed as detected by the process I/O controller 14, a "card file assembly" signal is applied to the input terminal 30 connected to the input of the NAND gate 32. Similarly, a "slot" selection signal is applied to the input terminal 34 connected to the other input of the gate 32 allowing the gate 32 to be "made." When a board "direction" signal, indicative of a "write" function is applied to the input terminal 40 of the gate 38 and a "strobe" signal 40 is applied to the input terminal 42 of the gate 38, the gate 38 is allowed to be "made." In the meantime a logical "high" is applied to the master clear terminal 44. The logical "high" on the input terminal 44 provides an enable signal for the gate 36. A second enable signal for the gate 36 will be provided when the address selection gate 32 is made. The gate 38 will be made when the "strobe" signal is applied. The making of the gate 38 will cause the gate 36 to be "made." The change in state of the gate 36 causes a toggle signal to be applied to the toggle input of the two latch assemblies 48 and 46. When the toggle signal is applied to the two latch assemblies 46 and 48, any signal that is present on the input leads 50a through 50h will be loaded into the corresponding latches 46a through 46d and 48a through 48d.

When a digital structure is being either powered up or powered down, there is a potential for spurious signals to be transmitted over the data lines such as those connected to the input terminals 50a through 50h. To prevent those spurious signals from being loaded into the latches 46 and 48, means are provided for preventing the operation of those latches until the applied power has been stabilized. To this end, the transistor 146 is normally in a conductive state during the power-up or power-down sequence. The conduction of the transistor 146 clamps the collector thereof effectively to ground placing a logical "low" on the "clear" terminals of the latch assemblies, forcing those latch assemblies to a clear state. Simultaneously, the logical "low" at the collector of the transistor 146 is applied through the diode 150 pulling the input to the inverter 152 to a logical "low." The resulting "high" at the base electrode of a transistor 86 causes that transistor to be nonconductive, thereby removing a power source from the coils 68 through 82 of the relays. Until the system has been fully powered and stabilized, the L.E.D. 130 is back biased and rendered nonconductive. When the power has been fully applied and stabilized the L.E.D. becomes forwardly biased by virtue of the logical "low" at the output of the inverter 118. The L.E.D. thereupon becomes conductive, indicative that full power is now established. The logical "low" at the output of the inverter 118 is applied to the input of the inverter gate 120 producing a logical "high" at the output thereof. That logical "high" is applied to enable the gate 112, the other input of which is energized when the gate 32 is made. A logical "high" on both terminals of the gate 112 allows that gate to send a signal back to the microprocessor indicating that the addressed board is present and powered up. When the power has been applied and stabilized, the transistor 146 is rendered nonconductive placing a logical "high" on the "clear" terminals of the latch assemblies 46 and 48 allowing them to be operative upon the occasion of a "toggle" signal from the gate 36. At the same time the logical "high" at the output of the transistor 146 allows the transistor 86 to become conductive, thereby applying a source of energy to the lower terminals of the relay coils 68 through 82.

Let it first be assumed that the apparatus is to be operated in a "latching" mode. For this, the "function" signal applied to the input terminal 160 will cause the flip-flop 158 to be "set." With the flip-flop 158 in a "set" condition a logical "low" will be applied to the output lines thereof which output is applied as one input to the flip-flop 158. The logical "low" at the input of the gate 168 produces a corresponding logical "high" at the output thereof. That logical "high" is applied to the diode 175, back biasing the same. The logical "high" at the output of the gate 168 is also applied as one of the inputs to the gate 180 producing a logical "low" at the output thereof, a logical "high" being applied to the other input terminal of the gate 180 from the output of the inverter 166. The logical "low" at the output of the gate 180 is applied as input to the inverter 182 producing a logical "high" at the output thereof. The logical "high" at the output of the gate 182 is applied to the diode 150, back biasing that diode. With both diodes 150 and 175 back biased, the transistor 86 remains in conduction until a "master-clear" signal is received at the input terminal 44. When that signal is received at the input terminal 44, the output of the inverter 166 is reversed to produce a logical "low" output. That logical "low" applied to the enabling input of the gate 180 causes the output of the gate 180 to go to a logical "high." That logical "high" is applied to the input of the inverter gate 182 causing the output thereof to go to a logical "low." The logical "low" at the output of the inverter 182 is applied to forwardly bias the diode 150, causing the transistor 86 to become nonconductive. When the transistor 86 becomes non-conductive, the energizing source is removed from the bus 84, hence, from any of the relay coils 68 through 82 which may have been energized.

Now let it be assumed that the relays are to be actuated in a momentary closure mode. As before, the data signals are applied to the input terminals 50a through 50h and, when the strobe pulse has keyed the gate 36, those signals are loaded into the latches 48a through 46b and 48a through 48d. At the same time, the signals from the microprocessor indicative of the amount of time that the relays are to remain closed is applied to the input terminals of the counter modules 174 and 176. The actuation of the gate 36 also provides a load enable signal for the three counter modules 174, 176 and 178. When the data signals have been loaded into the latches 46 and 48, the selected ones of the relay drivers 52 through 66 are energized providing a return path for the energizing current on the line 84 through the selected ones of the relay coils. In this case, however, the function signal applied to the input terminal 160 will cause the flip-flop 158 to remain in the "reset" condition. That "reset" condition produces a logical "high" at the output of the flip-flop 158 which is, in turn, applied as an enabling input signal to the gate 168. A second logical "high" enabling signal is applied to the input of the gate 168 from the inverter 166. A logical "low" remains on the third input to the gate 168 applied from the output of the inverter 170. Consequently, the diode 175 is back-biased allowing the transistor 86 to be conductive.

The application of the signals from the microprocessor to the input terminals of the counter modules 174 and 176 loads a predetermined count into those counters in accordance with the configuration code in the data base for this particular board. All "1's" are automatically loaded into the first counter module 178 as the output of the inverter 162. Simultaneously with the energization of the selected relays, the counters 178, 176, and 174 begin a countdown routine by virtue of the clock pulses applied to the countdown toggle input of the counter module 178 from the output of the gate 172. The preloading of all "1's" into the counter module 178 assures a minimun count of 16 clock pulses. When the counter modules 174, 176 and 178 have all counted down to 0, the "borrow out" pulse from the module 174 changes state to produce a logical "low" at the input of the inverter 170. That, in turn, produces a logical "high" at the third input terminal of the gate 168. With a logical "high" now appearing on all three input terminals of the gate 168, the output goes to a logical "low" which forwardly biases the diode 175 causing the transistor 186 to become non-conductive. The non-conductive state of the transistor 186 removes the energizing current from the line 184, hence resetting any or all of the relays which may have been energized. It may be seen that the length of time that the selected relays were energized is a function of the predetermined count set into the counter modules 174 and 176.

The logical "low" that appeared at the output of the gate 168 was also applied to the input of the gate 180 causing the output thereof to go through the logical "high." That logical "high" when applied to the inverter 182 causes a clear signal to be applied to the clear input terminals of the latches 46 and 48 causing them to be reset.

In either mode of operation, after the selected data has been loaded into the latches 46 and 48, and while the data is being held therein, an address-signal pair applied to the gate 32 accompanied by a "read" pulse applied to the input terminal 40 causes the AND gate 110 to be made. A logical "high" at the output of the AND gate 110 is applied as an enabling signal for the gates 94, 96, 98, 100, 102, 104, 106 and 108. The other input terminals of those gates are connected respectively to the output leads of the individual latches of the latch assemblies 46 and 48. Thus, on the occurrence of a "read" pulse addressed to the particular board, the gates 94 through 108 are enabled to transmit a signal back to the microprocessor along the data lines to indicate the present status of the latches, and, hence, the output relays of that selected board.

Figure 3:
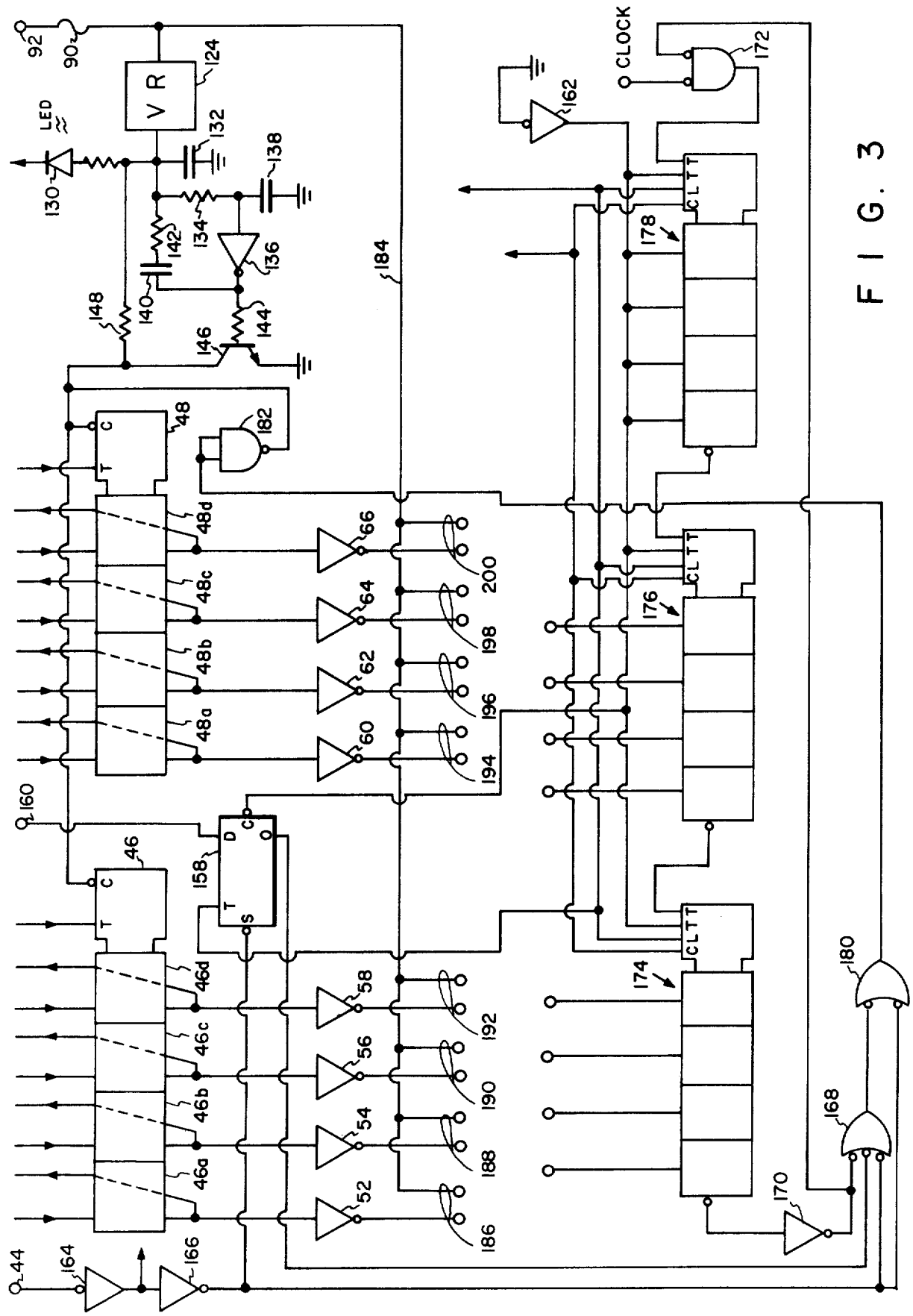
FIG. 3 is a logic block diagram of a portion of the circuit shown in FIG. 2 but configured for a solid state output.

In FIG. 3, there is shown a structure embodying the present invention wherein the output is a solid state output rather than a relay actuation. Those elements which are common to the corresponding elements of FIG. 2 are identified with the same reference numerals. Basically, the structure is identical to that of FIG. 2 in that data input signals are applied to the latch assemblies 46 from the microprocessor bus and are loaded therein on the occasion of the proper "address" and "strobe" pulses as in the case of FIG. 2. As before, the selection is made by a "function" signal applied to the input terminal 160 between latched, or holding, output and momentary operation. Assuming for the moment a holding type output, the flip-flop 158 again will be set leaving a logical "low" at the output terminal of the flip-flop. That logical "low" is applied as one input to the NAND gate 168, the output of which is then a logical "high." That logical "high" together with the logical "high" from the output of the inverter 166 produces a logical "low" output from the gate 180. The output from the gate 180 applied at the input to the inverter 182 leaves a logical "high" on the output of the gate 182, not effecting a clearing of the latches 46 and 48. The selected latches will be held in their "set" condition until the occurrence of a "master clear" signal, producing a logical "low" at the output of the inverter 166 which causes the output of the NAND gate 180 to go "high," producing a logical "low" at the output of the inverter 182, clearing the latches. While the selected latches are in their "set" condition, a logical "high" signal is applied to the corresponding ones of the line drivers 52 through 66. The selected ones of the drivers 52 through 66 are activated to produce a logical "low" or ground return path at the corresponding ones of the output terminal pairs 186 through 200. The other ones of the output terminal pairs 186 through 200 are connected to a common line 184 which is connected to a power supply terminal 92 through a fuse 90. Selected load devices may be connected across the respective pairs of the output terminals 186 through 200.

If it is determined to operate the system on a momentary mode, the signal applied to the "function" input terminal 160 is such as to cause the flip-flop 158 to be in its "reset" mode. In the "reset" mode, a logical "high" appears at the output terminal of the flip-flop 158 and is applied to one of the input terminals of the gate 168 as one enabling signal thereto. A second enabling signal is applied from the output of the inverter 166. As before, selected signals are applied to the inputs of the counter modules 174 and 176 to establish a predetermined count for the countdown operation of the counter in response to clock signals applied to the input of the gate 172. As before, when the counter counts down to zero, the "borrow output" of the counter module 174 goes "low" producing a logical "high" at the output of the inverter 170. That logical "high," first applied to the other input terminal of the gate 172, stops the operation of the clock. At the same time, the logical "high" is applied to the third input terminal of the gate 168 causing the output thereof to go "low." That "low" causes a logical "high" at the output of the gate 180 producing a logical "low" at the output of the inverter 182. That logical "low" applied to the "clear" input terminals of the latch assemblies 46 and 48 causes those latch assemblies to be cleared or reset, removing the input signal from the drivers 52 through 66 and, hence, from the output circuits 186 through 200.

Thus it may be seen that there has been provided, in accordance with the presence invention, an improved digital output circuit for computer based process control systems in which accommodations are provided for four different modes of output signals.

The embodiments of the invention in which an exclusive property or privilege is claimed are defined as follows:

1. A digital computer based process control system including a digital output control circuit and digital computer means for supplying digital data and control signals to said output control circuit, said output control circuit comprising:

a plurality of digital data input terminal means for receiving digital data signals from said computer means;

a plurality of holding latch means corresponding in number to said plurality of input terminal means;

means for connecting individual ones of said input terminal means to corresponding ones of said latch means for selectively storing in said latch means digital data applied to said input terminals;

signal responsive logic control means for controlling the selective operation of said latch means, said logic control means including means responsive to address signals derived from control signals supplied by said computer means, and to strobe and direction signals also supplied by said computer means;

a plurality of output circuit means corresponding in number to said plurality of latch means and connected to respond, respectively, to output signals from said latch means, said output circuit means being operable to produce output signals selectively in a first or second mode; and mode control means responsive to a function control signal from said computer means for selectively controlling the output mode of said output signals.

2. The process control system as set forth in claim 1 wherein said first and second mode for said output signals comprise a continuous or holding mode and a timed momentary mode.

3. The process control system as set forth in claim 2 wherein said output control circuit includes a selectively variable timing means responsive to signals from said computer means for controlling the operation of said timing means, and control logic means responsive to said timing means for controlling the duration of said output signals in said timed momentary mode.

4. The process control system as set forth in claim 3 wherein said timing means comprises a programmable counter means, said counter means being preset in accordance with coded control signals from said computer means.

5. The process control system as set forth in claim 4 wherein said control logic means responsive to said timing means includes gating means responsive to an output signal from said counter means for de-energizing said output circuit means on the occurrence of said signal from said timing means.

6. The process control system as set forth in claim 2 wherein said mode control means includes a flip-flop means responsive to said function control signal, and gating means connected to be responsive to an output signal from said flip-flop means for effecting said selective control of the output mode of said output signals.

7. The process control system as set forth in claim 6 wherein said output control circuit includes a selectively variable timing means responsive to signals from said computer means for controlling the operation of said timing means comprising a programmable counter means which may be preset in accordance with coded control signals from said computer means, and control logic means including said gating means connected to be responsive to an output signal from said counter means for de-energizing said output circuit on the occurrence of said signal from said counter means when said flip-flop has been conditioned to effect said timed momentary mode.

* * * * *